(12) United States Patent
Kasai et al.

(10) Patent No.: US 6,575,720 B2
(45) Date of Patent: Jun. 10, 2003

(54) BEARING AND SHAFT COOLING DEVICE

(75) Inventors: Shigehiro Kasai, Takasago (JP);
Katsunori Takahashi, Takasago (JP);
Nobuki Nagami, Takasago (JP); Kazuo Iritani, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/985,011

(22) Filed: Nov. 1, 2001

(65) Prior Publication Data

US 2002/0051723 A1 May 2, 2002

(30) Foreign Application Priority Data

Nov. 2, 2000 (JP) ........................ 2000-336653

(51) Int. Cl.⁷ ........................ F04C 2/18; F04C 13/00; F04C 15/00; F16C 3/16; F16C 17/00
(52) U.S. Cl. ........................ 418/83; 418/87; 418/94; 418/206.3; 418/206.7; 384/321; 384/900
(58) Field of Search ........................ 418/83, 84, 87, 418/94, 206.3, 206.7; 384/321, 900

(56) References Cited

FOREIGN PATENT DOCUMENTS

| FR | 1142283 | * | 3/1957 | ........................ 384/321 |
|---|---|---|---|---|
| JP | 6-45135 | | 6/1994 | |
| JP | 9-217685 | | 8/1997 | |
| JP | 10-141247 | | 5/1998 | |

* cited by examiner

*Primary Examiner*—John J. Vrablik
(74) *Attorney, Agent, or Firm*—Oblon, Spivak, McClelland, Maier & Neustadt, P.C.

(57) ABSTRACT

The bearing cooling device causes cooling media to flow into the interior of a journal bearing 8 for supporting a shaft part 7 by lubrication of high viscous fluid and the interior of the shaft part 7 to cool the shaft part 7 and the bearing 8. At this time, cooling medium temperature of the bearing 8 is set to be higher than cooling medium temperature of the shaft part 7. It is constituted so that the cooling medium passes the cooling medium passage and thereafter passes the cooling medium passage internally of the bearing. A heated medium supply device for supplying a heated medium to each cooling medium passage may be provided. The bearing cooling device is used suitably for a gear pump.

10 Claims, 3 Drawing Sheets

BEARING AND SHAFT COOLING DEVICE

BACKGROUND OF THE INVENTION

1. Field of the Invention

The present invention relates to a bearing cooling device used for a gear pump for carrying high viscous fluid such as molten resins, and the like.

2. Description of the Related Art

A conventional gear pump for carrying molten resins has a pair of gear rotors. The gear rotor is supported rotatably on a pump body through a bearing. This bearing is a journal bearing, which is a self-lubricating type in which a part of molten resins carried serves as bearing lubricant. In the gear pump of this kind, it is important to increase production amount (carrying amount). Methods for increasing the production amount (carrying amount) include a method for increasing the number of revolutions, and a method for widening face width. However, any of methods increase the burden on the bearing. Therefore, there is high possibility of resulting in backing, and it has not been easy to increase the production amount.

When the number of revolutions is increased, the shearing speed becomes high to increase heat generation of resins. Then, the viscosity of resins lowers, and the bearing support ability lowers. Further, when the face width is widened, the load increases, and the bearing support ability lowers.

In the gear pump of this kind, it is most effective for enhancing the bearing ability to lower the temperature of molten resin as lubricant to raise the viscosity of resins.

Cooling methods for the lubricant (molten resins) include cooling a rotor shaft, cooling a bearing, or a combing the formers.

Incidentally, the cooling of a bearing as described above is important, but there gives rise to a problem that the excessive cooling of a bearing brings forth shrinkage of a bearing itself, as a result of which bearing clearance reduces, resulting in baking.

SUMMARY OF THE INVENTION

It is an object of the present invention to provide a cooling device for a bearing for achieving higher speed (higher production amount) of the device and preventing baking of a bearing.

In the present invention, cooling medium is caused to flow into the interior of a journal bearing for supporting a shaft part by lubrication of high viscous fluid and the interior of the shaft part to cool the shaft part and the bearing. The temperature of the cooling medium of the bearing is set to be higher than a temperature of cooling medium of the shaft part.

In this case, preferably, the cooling medium after having been flown into the shaft part is caused to flow into the bearing.

Further, an annular space formed internally of the bearing and a partitioning wall provided spirally within the annular space constitute a cooling medium passage. Preferably, the cooling medium passage is a two-spiral groove.

The bearing cooling device of the present invention is suitably used for a gear pump.

DESCRIPTION OF THE PREFERRED EMBODIMENTS

The embodiments of the present invention will be described hereinafter with reference to the drawings.

Figure 1:
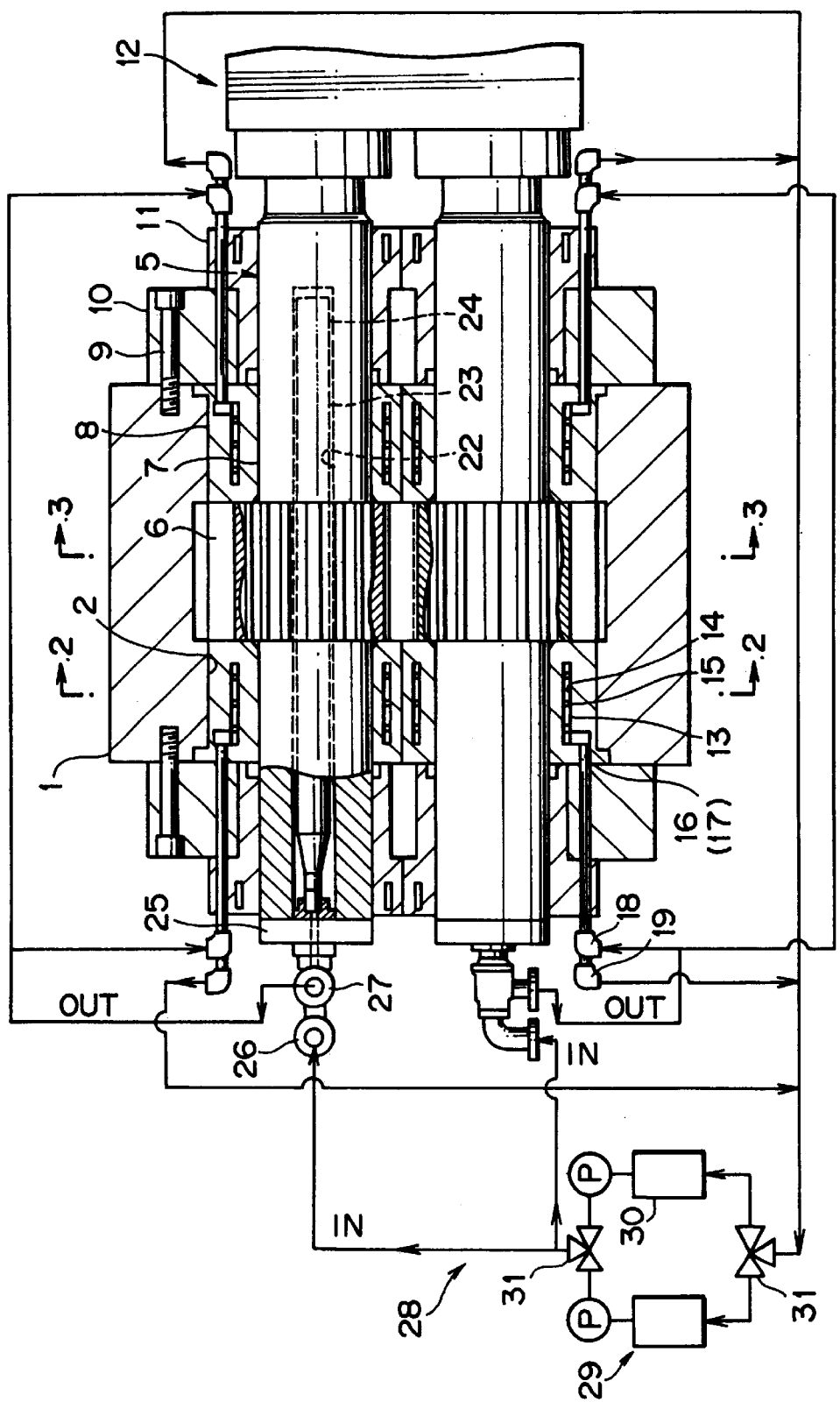
FIG. 1 is a sectional view of a gear pump showing an embodiment of the present invention.
Figure 2:
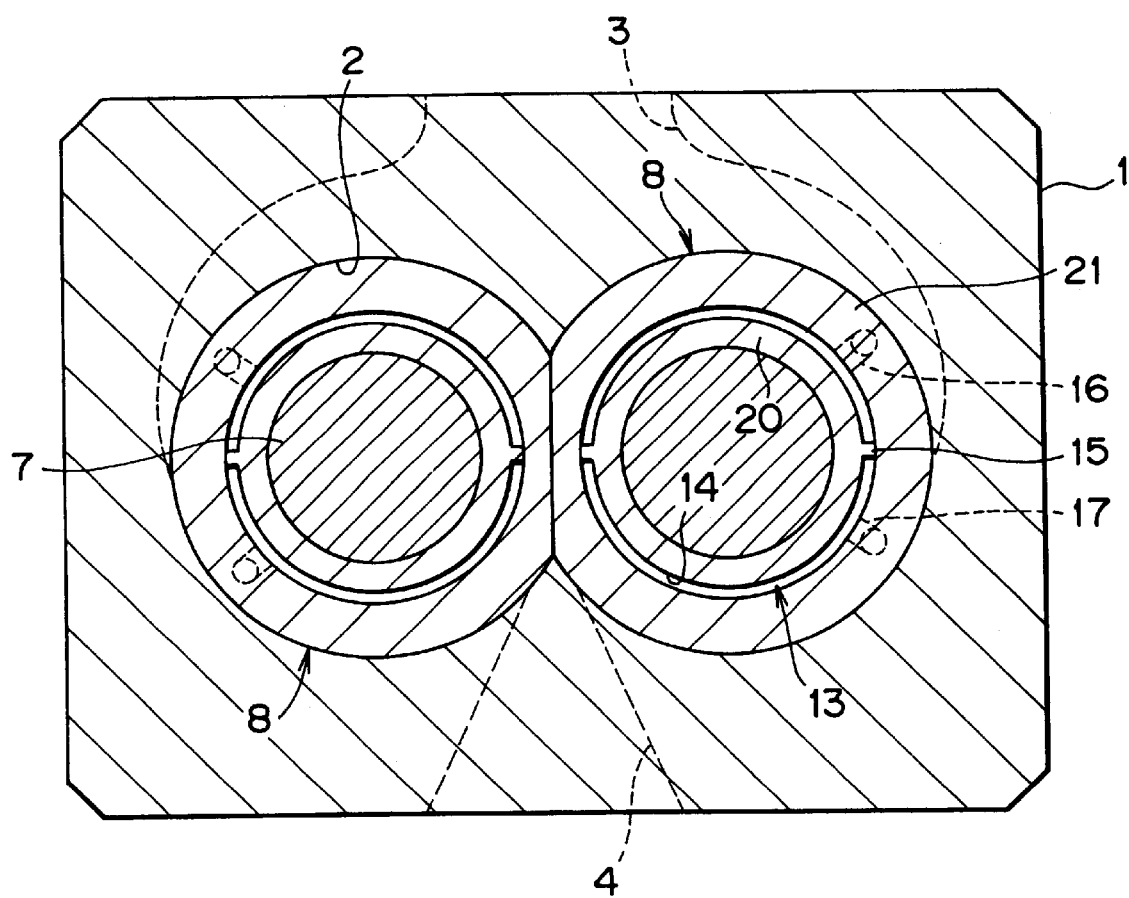
FIG. 2 is a sectional view taken on line 2—2 of FIG. 1.
Figure 3:
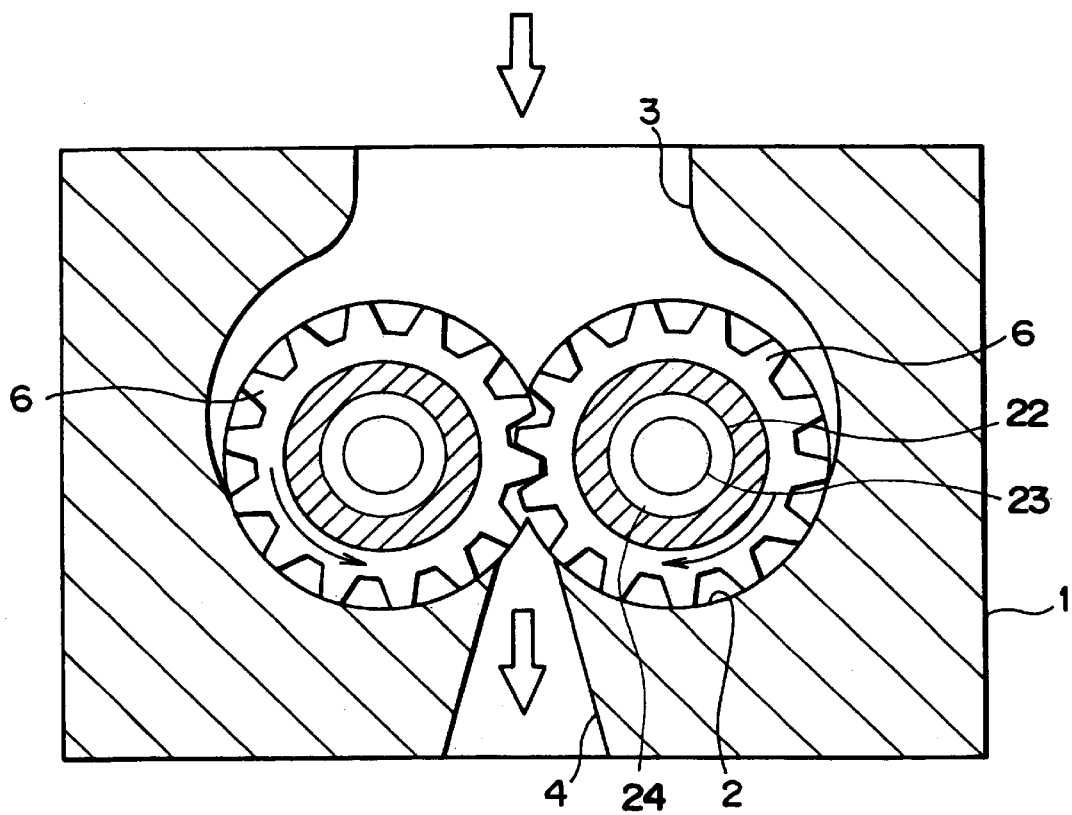
FIG. 3 is a sectional view taken on line 3—3 of FIG. 1.

FIG. 1 to FIG. 3 show a gear pump for carrying quantitative molten resins in a mixing granulating system. The gear pump has a block-like body 1. A glasses-like rotor housing hole 2 extends through and is formed in the body 1. Further, a resin inlet 3 and outlet 4 are formed, through the rotor housing hole 2, on the both sides of the latter.

As shown in FIG. 1, a pair of rotors 5, 5 are housed in the rotor housing hole 2. The rotor 5 comprises gear parts 6 and shaft parts formed on both sides thereof. The both gear parts 6 are always meshed with each other. The shaft part 7 is supported rotatably by a journal bearing 8 fitted in the rotor housing hole 2. The bearing (8) is prevented from slipping out of the rotor housing hole 2 by a bearing retainer 10 secured to the body 1 by means of a bolt 9.

A seal member 11 is secured to the bearing retainer 10. In the seal member 11 and the shaft part 7, the molten resins are prevented from flowing outside by means of a labyrinth seal.

One end of the shaft part 7 of the rotor 5 is connected to a drive device 12. The rotor 5 is rotated and driven in a direction indicated by arrow of FIG. 3, and the molten resins are carried from the resin inlet 3 to the outlet 4.

The gear pump is of a self-lubricating type, in which a part of the molten resins carried is supplied as lubricant for the bearing 8 and the shaft part 7. For the self-lubricating construction, a well known construction (for example, U.S. Pat. No. 5,292,237) can be employed. The seal member 11 is provided to prevent leakage of the molten resins outside used for lubrication of a bearing.

As shown in FIG. 2, the journal bearing 8 is formed internally with a cooling medium passage 13, and is constituted as a cooling bearing device.

The cooling medium passage 13 is constituted by an annular space 14 formed internally of the bearing 8, and a partitioning wall 15 provided in the annular space 14.

Figure 4:
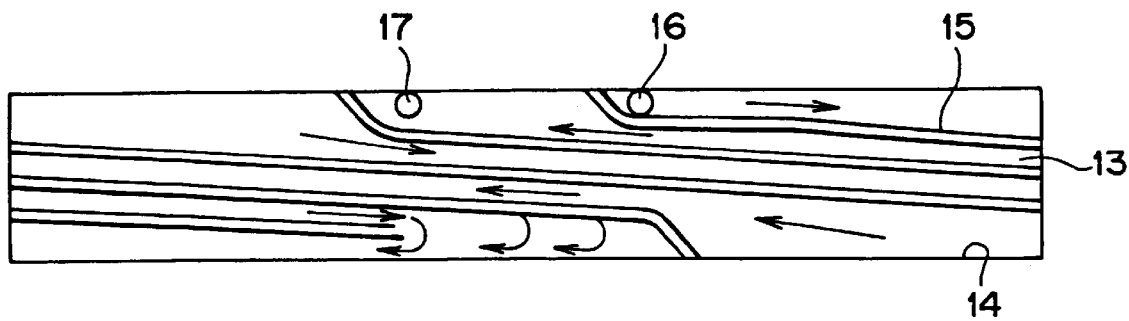
FIG. 4 is a peripheral developed view of an annular space (cooling jacket).

The partitioning wall 15 is provided spirally as shown in the peripheral developed view of FIG. 4. By the partitioning wall 15, the cooling medium passage 13 comprising two spiral grooves is formed in the annular space 14. A cooling medium inlet 16 is formed at the end of one groove, and a cooling medium outlet 17 is formed at the end of the other groove. An inlet pipe 18 and an outlet pipe 19 extending through the bearing retainer 10 and the seal member 11 are connected to the cooling medium inlet 16 and outlet 17.

As shown in FIG. 2, the bearing 8 is constituted by integrally connecting an inner circumferential member 20 and an outer circumferential member 21. The cooling medium passage 13 is formed in a boundary between the inner circumferential member 20 and the outer circumferential member 21.

In this embodiment, the inner circumferential member 20 is formed in the outer circumferential surface 21 with an annular recess forming the annular space 14, and a spiral partitioning wall 15 shown in FIG. 4 is formed within the annular recess. Methods for integrating of the inner circumferential member 20 formed in the outer circumferential surface 21 include welding, welding after shrinkage fitting and the like.

In the integrated state as described above, the outer circumferential surface of the partitioning wall 15 is in contact with the inner circumferential surface of the outer circumferential member 21. That is, the annular space 14 is surrounded by the inner circumferential surface of the outer circumferential member 21 and the outer circumferential surface of the annular recess of the inner circumferential member 20, and the partitioning wall 15 is formed over the inner and outer circumferential surfaces.

The partitioning wall formed over the inner and outer circumferential surfaces of the annular space 14 functions as a strengthening member. Accordingly, even if the annular space is made large, the lowering of the bearing strength can be compensated for.

As shown in FIG. 1, the shaft center part of the rotor 5 is bored with a hole 22 in an axial direction from one end thereof. A pipe 23 is inserted into the hole 22 through an annular clearance, which clearance serves as a cooling medium passage 24. The cooling medium passage is provided, at least, so as to correspond to the shaft part 7 of the rotor 5.

A rotational joint 25 is provided on the end of the rotor 5, and the joint 25 is provided with a cooling medium inlet 26 and outlet 27. The inlet 26 is communicated with the cooling medium passage 24, and the outlet 27 is communicated with the interior of the pipe 23. The cooling medium supplied from the inlet 26 passes through the cooling medium passage 24, enters pipe 23 from the end opening of the pipe 23, and flows out of the outlet 27. A temperature adjusting medium supply device 28 as a cooling medium supply device is connected to the cooling medium inlet 16 and outlet 17 for cooling a bearing, and the inlet 26 and outlet 27 for cooling a rotor.

In the temperature adjusting medium supply device 28, a cooling medium supply source 29 and a heated medium supply source 30 are free to be switched by a three-way valve 31. At start of the gear pump, the heated medium is supplied from the heated medium supply source 30 to the bearing 8 and the rotor 5 to thereby preheat and melt the cooled and solidified medium. When preheating is completed, the three-way valve 31 is switched to supply cooling medium from the cooling medium source 29 to cool the bearing 8 and at least the shaft part 7 of the rotor 5.

Piping of the temperature adjusting medium supply device 28 is first connected from the three-way valve 31 to the inlet 26 for cooling a rotor, piping from the outlet 27 is connected to the inlet pipe 18 for cooling a bearing, and piping from the outlet pipe 19 for cooling a bearing is returned to the temperature adjusting medium supply device 28.

That is, the medium from the temperature adjusting medium supply device 28 first passes the rotor 5 and thereafter passes the bearing 8.

By the provision of the piping construction as described above, the cooling medium temperature within the bearing 8 can be set to be higher than the cooling medium temperature within the rotor 5.

According to cooling of the above constitution, the cooling temperature of the bearing 8 can be set to be higher than the rotor 5, shrinkage of the inside diameter of the bearing caused by excessive cooling is prevented. Accordingly, the reduction in the bearing clearance is prevented and the baking is prevented.

It is noted that the present invention is not limited to the above-described embodiment, but the cooling medium supply device of the bearing may be provided separately from that of the rotor, and the temperature control of the bearing 8 may be carried out independently of the rotor 5.

Further, the medium from the temperature adjusting medium supply device 28 is not limited to an arrangement that the cooling medium supply device 29 and the heated medium supply device 30 are free to be switched by the three-way valve 31, but there may be employed an arrangement that there is temperature adjusting range from cooling to heating, and the medium is supplied from a single supply source. In this case, preferably, the temperature adjusting medium is heated (preheated) by hot oil at 100~200°, and cooling is carried out by temperature control of a hot oil unit.

Further, the gear pump is not limited to one for carrying molten resin. Further, the type of the cooling medium passage of the bearing 8 or the rotor 5 may be of the conventional type. Furthermore, the temperature adjusting medium supply device 28 may be of a type in which only the cooling medium is supplied.

What is claimed is:

1. A bearing cooling device of a journal bearing for supporting a shaft part by lubrication of a high viscous fluid, comprising:
   a cooling medium passage provided internally of said bearing;
   a cooling medium passage provided internally of said shaft part; and
   cooling medium supply means for setting cooling medium temperature of said bearing higher than that of said shaft part.

2. The bearing cooling device according to claim 1, wherein said cooling medium supply means comprises said cooling medium supply device of a bearing and said cooling medium supply device of a shaft part, individually.

3. The bearing cooling device according to claim 1, wherein said cooling medium passage provided internally of said bearing is constituted by an annular space formed internally of said bearing and a partitioning wall provided spirally within said annular space.

4. The bearing cooling device according to claim 1, wherein said cooling medium passage provided internally of said bearing comprises two spiral grooves.

5. A gear pump provided with the bearing cooling device according to claim 1.

6. A bearing cooling device of a journal bearing for supporting a shaft part by lubrication of high viscous fluid, comprising:
   a cooling medium passage provided internally of said bearing;
   a cooling medium passage provided internally of said shaft part; and
   cooling medium supply means for supplying cooling medium to said each cooling medium passage; said cooling medium from said cooling medium supply means passing the cooling medium passage provided internally of said shaft part and thereafter passing the cooling medium passage internally of said bearing.

7. The bearing cooling device according to claim 6, wherein said cooling medium passage provided internally of said bearing is constituted by annular space formed internally of said bearing and a partitioning wall provided spirally within said annular space.

8. The bearing cooling device according to claim 6, wherein said cooling medium passage provided internally of said bearing comprises two spiral grooves.

9. The bearing cooling device according to claim 6, further comprising: a heated medium supply device for supplying heated medium to said each cooling medium passage.

10. A gear pump provided with the bearing cooling device according to claim 6.

* * * * *